United States Patent
Aizawa et al.

(10) Patent No.: US 9,853,279 B2
(45) Date of Patent: Dec. 26, 2017

(54) BATTERY AND ULTRASONIC BONDING METHOD FOR BATTERY

(75) Inventors: Takahiro Aizawa, Yokohama (JP); Yukihiro Ikeya, Yokohama (JP); Taizo Tomioka, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 1381 days.

(21) Appl. No.: 13/204,818

(22) Filed: Aug. 8, 2011

(65) Prior Publication Data

US 2012/0070720 A1    Mar. 22, 2012

(30) Foreign Application Priority Data

Sep. 21, 2010   (JP) .................................. 2010-210760

(51) Int. Cl.
| | | |
|---|---|---|
| *H01M 2/30* | (2006.01) | |
| *B23K 20/10* | (2006.01) | |
| *H01M 2/26* | (2006.01) | |
| *B23K 101/38* | (2006.01) | |
| *B23K 103/10* | (2006.01) | |

(52) U.S. Cl.
CPC ............. *H01M 2/30* (2013.01); *B23K 20/10* (2013.01); *H01M 2/263* (2013.01); *B23K 2201/38* (2013.01); *B23K 2203/10* (2013.01)

(58) Field of Classification Search
CPC ....................................................... H01M 2/30
USPC ....................................................... 429/179
See application file for complete search history.

(56) References Cited

U.S. PATENT DOCUMENTS

| 8,173,288 B2 | 5/2012 | Cheon et al. | |
|---|---|---|---|
| 2006/0063068 A1* | 3/2006 | Cheon et al. | 429/161 |

FOREIGN PATENT DOCUMENTS

| CN | 101335339 A | 12/2008 |
|---|---|---|
| JP | 9-82305 A | 3/1997 |
| JP | 2002-100340 A | 4/2002 |
| JP | 2003-151527 A | 5/2003 |
| JP | 2008-84755 A | 4/2008 |
| JP | 2009-26490 | 2/2009 |
| JP | 2010-73408 A | 4/2010 |

(Continued)

OTHER PUBLICATIONS

Office Action dated Apr. 22, 2014 in Japanese patent Application No. 2013-035991 (with English translation).

(Continued)

*Primary Examiner* — Ula C Ruddock
*Assistant Examiner* — Frank Chernow
(74) *Attorney, Agent, or Firm* — Oblon, McClelland, Maier & Neustadt, L.L.P.

(57) ABSTRACT

The present invention provides a battery including a container, an electrode group including a positive electrode and a negative electrode, multiple current collecting tabs being extended from any one of the positive electrode and the negative electrode of the electrode group, and overlapped with one another; a lead bonded to at least one of the current collecting tabs by ultrasonic bonding, a lid configured to close an opening portion of the container, and an external terminal provided on the lid and connected to the at least one current collecting tab via the lead, in which the lead has a cross-sectional area that is increased in a middle of extension of the lead from an ultrasonic-bonded portion to the at least one of the current collecting tabs to the external terminal.

1 Claim, 5 Drawing Sheets

(56) References Cited

FOREIGN PATENT DOCUMENTS

| | | |
|---|---|---|
| JP | 2011-49065 A | 3/2011 |
| JP | 2011-165437 A | 8/2011 |
| KR | 10-2006-0026602 A | 3/2006 |

OTHER PUBLICATIONS

Office Action dated Nov. 20, 2012 in Japanese Patent Application No. 2010-210760 (with English-language translation).
Office Action dated Nov. 2, 2012 in Korean Patent Application No. 10-2011-0077699 (with English-language translation).
Office Action and Search Report dated Oct. 30, 2013 in the counterpart Chinese Application No. 201110227438.X (with English Translation).

\* cited by examiner

BATTERY AND ULTRASONIC BONDING METHOD FOR BATTERY

TECHNICAL FIELD

The present invention relates to a battery, such as a secondary battery, and an ultrasonic bonding method for a battery, and more particularly relates to a technology for a non-aqueous electrolyte secondary battery.

BACKGROUND ART

In recent years, non-aqueous electrolyte secondary batteries have been developed, which are capable of fast charge and high power discharge as well as have an excellent cyclic performance. Such non-aqueous electrolyte secondary batteries are thus suitable as vehicle secondary batteries to be mounted on hybrid vehicles and electric vehicles and as power storage secondary batteries used for electric power leveling.

The secondary battery as described above has a structure in which an electrode group and an electrolyte solution impregnated in the electrode group are housed in a battery container as described in Japanese Patent Application Publication No. 2009-26490. In the structure, the electrode group is formed by winding up a strip-shaped positive electrode and a strip-shaped negative electrode with a separator interposed therebetween, and forming the resultant body in a flat shape.

Moreover, at both front and back end portions of the electrode group, metal foils serving as a current collector of the positive electrode and metal foils serving as a current collector of the negative electrode protrude out while being overlapped with one another by the winding up, thereby forming current collecting tabs 2a, 2b as illustrated in FIG. 1. A lead 5, which electrically communicates with an external terminal for taking out a current, is connected to the current collecting tabs 2a, 2b.

The lead 5 is connected to the current collecting tabs 2a, 2b by ultrasonic bonding in a state where the lead 5 is overlapped with the metal foils of the current collecting tabs 2a, 2b, which protrude out at each of the front and back end portions of a power generating element. However, if the lead 5 and the metal foils of the current collecting tabs 2a, 2b are directly ultrasonic-bonded to each other, there are possibilities that the metal foil, which is thin, is broken, and that the lead 5 is connected at an incorrect position.

To address this, the following practice has been conducted: the metal foils of the current collecting tabs 2a, 2b are clamped by clip-shaped plates 4a, 4b, then the clip-shaped plates 4a, 4b are overlapped with the lead 5, and the ultrasonic bonding is performed thereon from above and below. In this case, as the lead 5, a plate member has been used, which has a cross-sectional area uniform over an area thereof from a portion connected to the current collecting tabs 2a, 2b, to the external terminal or to a component part communicating with the external terminal.

Moreover, as the lead 5, a plate member having a rectangular cross section is used in order to facilitate the ultrasonic bonding. The electric resistance of a portion between the electric group and the external terminal needs to be decreased in order to improve the fast charge performance and the high power discharge performance of the battery. The decreasing of the electric resistance then requires an increase in the cross-sectional area of the lead 5.

If the cross-sectional area of the lead 5 is difficult to increase in the direction of the winding axis of the electrode group, that is, in the width direction because of the product limitation, the cross-sectional area is increased in a direction orthogonal to the direction of the winding axis of the electrode group, that is, in the thickness direction.

However, the increase in the thickness of the lead 5 increases its rigidity against an ultrasonic vibration applied to connect the lead 5 to the current collecting tabs 2a, 2b. Accordingly, it becomes difficult for the ultrasonic vibration required for the bonding to be transmitted. As a result, the lead 5 and the metal foils of the current collecting tabs 2a, 2b are not sufficiently bonded, making it difficult to secure a required bond strength.

Alternatively, a laser welding is known as a method of bonding the metal foils of the current collecting tabs 2a, 2b and the lead 5, in addition to the above-described ultrasonic bonding. The laser welding utilizes laser to bond the metal foils of the current collecting tabs 2a, 2b and the lead 5. However, there is a concern that the separator may be damaged by the heat of the laser at a portion bonded by the laser. For this reason, the output of the laser cannot be increased, and therefore, the required bond strength may not be secured.

SUMMARY OF INVENTION

An objective of the present invention is to provide a battery and an ultrasonic bonding method for a battery that are capable of achieving a reduction in an electric resistance of a lead and securing an excellent bonding strength, by employing ultrasonic bonding.

A battery according to an embodiment includes: a container; an electrode group being housed in the container and including a positive electrode and a negative electrode; a plurality of current collecting tabs being extended from any one of the positive electrode and the negative electrode of the electrode group, and overlapped with one another; a lead bonded to at least one of the current collecting tabs by ultrasonic bonding; a lid configured to close an opening portion of the container; an external terminal provided on the lid and connected to the at least one current collecting tab via the lead. In addition, the lead has a cross-sectional area that is increased in a middle of extension of the lead from an ultrasonic-bonded portion to the at least one of the current collecting tabs to the external terminal.

In addition, an ultrasonic bonding method for a battery according to an embodiment includes the steps of: forming a current collecting tab by overlapping a plurality of metal foils extended from any one of a positive electrode and a negative electrode of an electrode group including the positive electrode and the negative electrode; placing a lead on one surface side of the current collecting tab, the lead being configured to connect the current collecting tab and an external terminal, the lead having a cross-sectional area that is increased in a middle of extension of the lead from an ultrasonic-bonded portion to the metal foils of the current collecting tab to the external terminal; placing a stage on another surface side of the current collecting tab; and ultrasonic-bonding the lead and the metal foils of the current collecting tab by applying a load and an ultrasonic vibration to the lead, the metal foils of the current collecting tab, and the stage by use of an ultrasonic vibrating unit.

DESCRIPTION OF THE PREFERRED EMBODIMENT

Hereinafter, batteries and ultrasonic bonding methods for a battery of embodiments of the present invention will be described in detail with reference to the drawings.
(First Embodiment)

Figure 1:
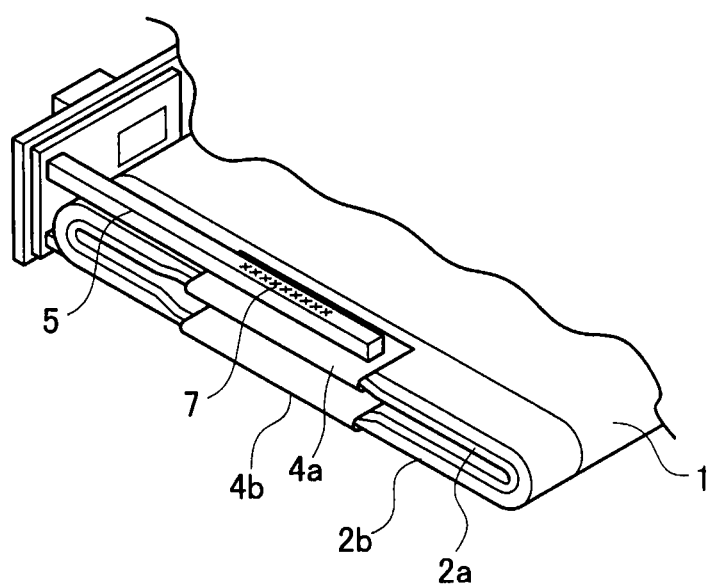
FIG. 1 is a perspective view of the vicinity of a positive-electrode current collecting tab, illustrating a configuration of a conventional battery.
Figure 2:
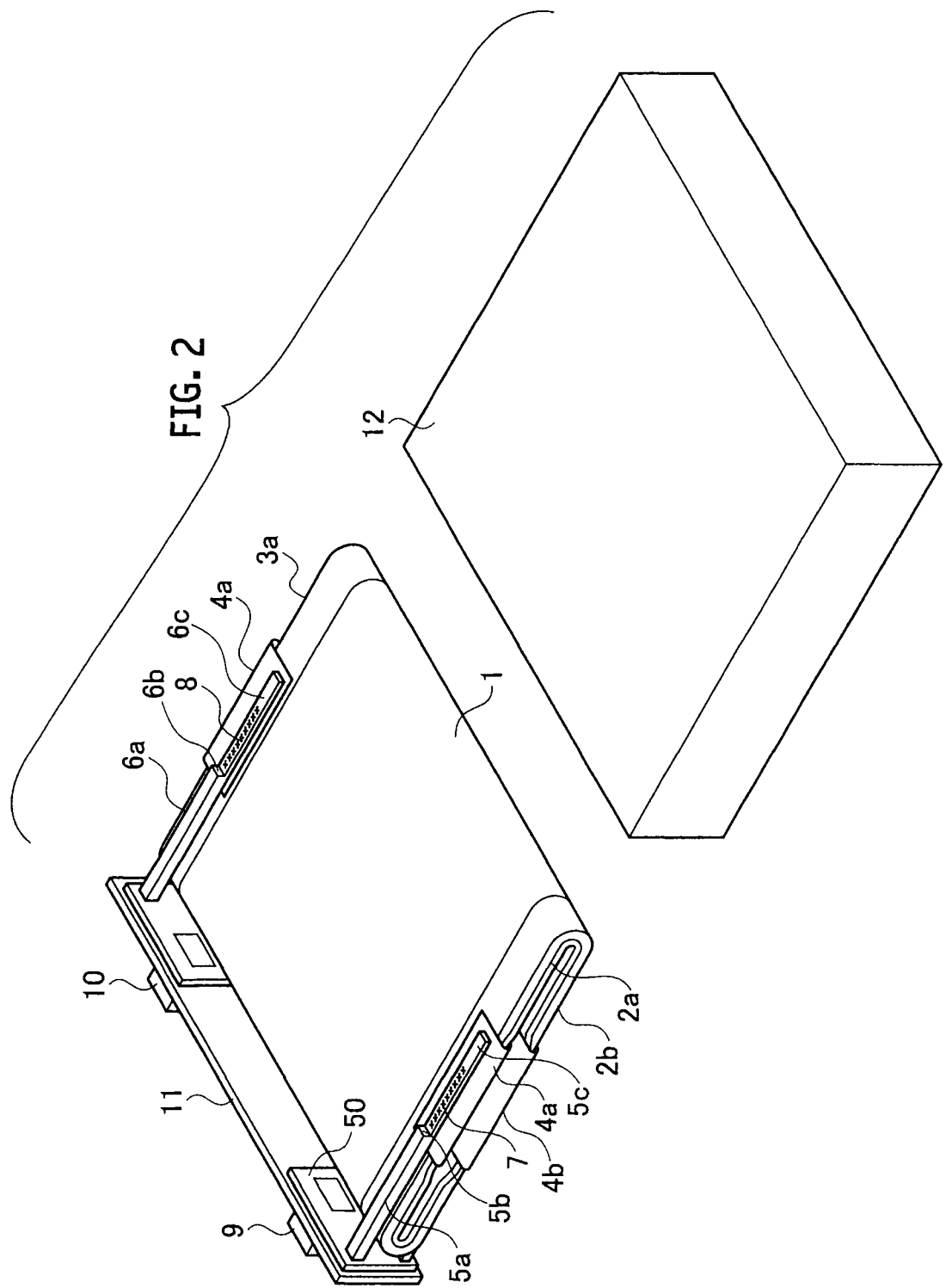
FIG. 2 is a perspective view illustrating a configuration of a battery according to a first embodiment.
Figure 3:
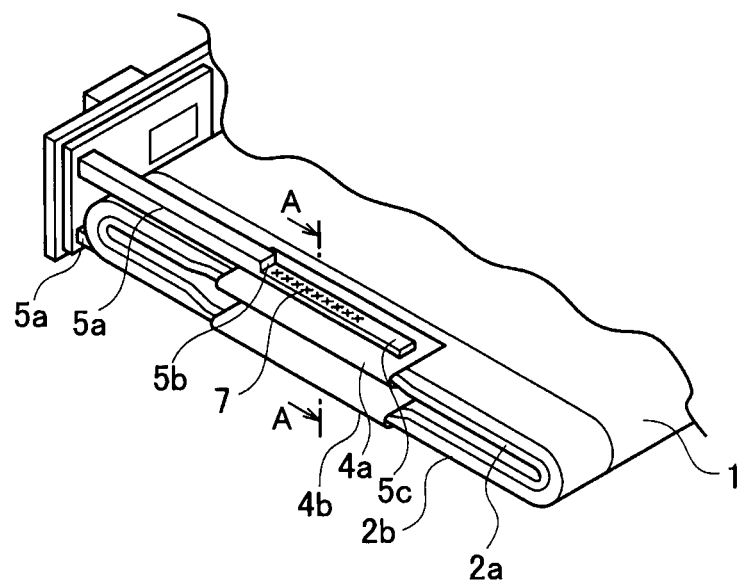
FIG. 3 is a perspective view of the vicinity of a portion where a positive-electrode lead is connected to positive-electrode current collecting tabs, of the battery according to the first embodiment.

FIG. 2 is a perspective view illustrating a configuration of a battery according to a first embodiment of the present invention. FIG. 3 is a perspective view of the vicinity of a portion where a positive-electrode lead is connected to positive-electrode current collecting tabs, of the battery according to the first embodiment. The battery illustrated in FIG. 2 is a battery using a non-aqueous electrolyte, and includes a container 12, multiple current collecting tabs 2a, 2b (3a, 3b), leads 5a to 5c (6a to 6c), a lid 11, and external terminals 9 (10). The current collecting tabs 2a, 2b (3a, 3b) are each extended from a positive electrode or a negative electrode of an electrode group 1 including the positive electrode and the negative electrode, and are overlapped with each other. The leads 5a to 5c (6a to 6c) are each bonded to at least one of the current collecting tabs 2a, 2b (3a, 3b) by ultrasonic bonding. The lid 11 is configured to close an opening portion of the container 12. The external terminals 9 (10) are provided on the lid 11 and connected to the corresponding current collecting tabs 2a, 2b (3a, 3b) via the corresponding leads 5a to 5c (6a to 6c).

Each of the leads 5a to 5c (6a to 6c) has a cross-sectional area that is increased in the middle of its extension from the ultrasonic-bonded portion to the corresponding current collecting tabs 2a, 2b (3a, 3b) to the corresponding external terminal 9 (10).

The container 12 is formed by molding a plate of a metal such as aluminum or an aluminum alloy. The electrode group 1 is fabricated by spirally winding a sheet-shaped positive electrode and a sheet-shaped negative electrode with an unillustrated separator interposed therebetween, and then forming the resultant body into a flat shape capable of being housed in the container 12.

The positive electrode is fabricated by applying a positive-electrode active material onto a current collector made of an aluminum foil or an aluminum-alloy foil. An unillustrated non-aqueous electrolyte solution is housed in the container 12, and is impregnated in the electrodes. The positive-electrode current collecting tabs 2a, 2b are formed by partially extending the current collector of the positive electrode.

On the other hand, the negative-electrode current collecting tabs 3a, 3b are formed by partially extending the current collector of the negative electrode. The positive-electrode lead 5a to 5c and the negative-electrode lead 6a to 6c are overlapped with the metal foils of the current collecting tabs of the respective electrodes, and are connected respectively at a positive-electrode connecting portion 7 and a negative-electrode connecting portion 8 by ultrasonic bonding.

In order to prevent the thin metal foils of the current collecting tabs 2a, 2b (3a, 3b) from being broken and the overlapped current collecting tabs 2a, 2b (3a, 3b) from being displaced at the time of connecting, the metal foils of the current collecting tabs 2a, 2b (3a, 3b) are clamped by clip-shaped plates 4a, 4b and then overlapped with the corresponding leads 5a to 5c (6a to 6c), and thereafter, the ultrasonic bonding is performed thereon from above and below.

Figure 4:
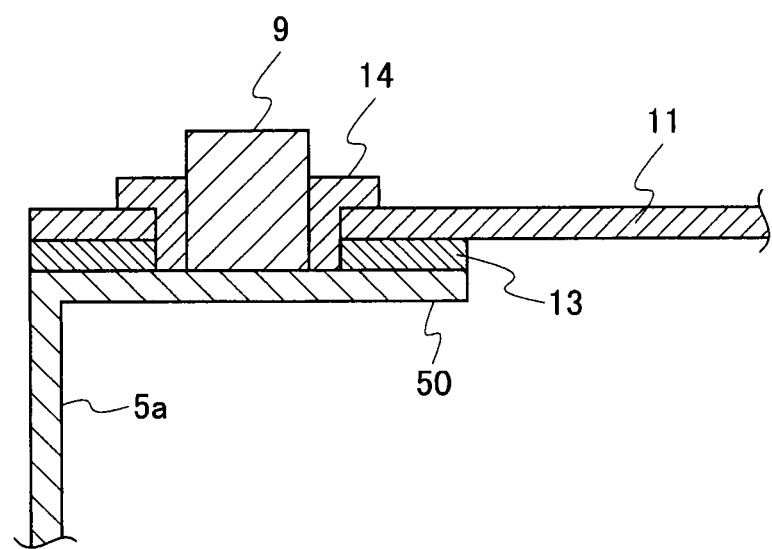
FIG. 4 is a cross-sectional view of a portion around a lead front-end portion, a lid, and an external terminal, of the battery according to the first embodiment.

FIG. 4 is a cross-sectional view of a portion around a lead front-end portion 50, the lid 11, and the external terminal 9, of the battery according to the first embodiment. The lead front-end portion 50 of the lead 5a is electrically connected to the external terminal 9. A plastic 13 is disposed between the lead front-end portion 50 and the lid 11, and a plastic 14 is disposed between the external terminal 9 and the lid 11, so that the external terminal 9 and the lid 11 are electrically isolated from each other. Note that a portion around the lead front-end portion 50, the lid 11, and the external terminal 10 is also formed in the same manner.

The lead 5a to 5c electrically connects the positive-electrode current collecting tabs 2a, 2b and the positive-electrode external terminal 9. The lead 6a to 6c electrically connects the negative-electrode current collecting tab 3a, 3b and the negative-electrode external terminal 10. Each lead includes a thick lead 5a (6a), a step portion 5b (6b) at which the cross-sectional area of the lead changes stepwise, and a thin lead 5c (6c). An ultrasonic-bonded portion (the positive-electrode connecting portion 7 and the negative-electrode connecting portion 8), which is ultrasonic-bonded to the current collecting tabs 2a, 2b, is formed in the thin lead 5c (6c).

Therefore, decreasing the thickness of the lead 5c (6c) having the ultrasonic-bonded portion formed therein facilitates transmission of an ultrasonic vibration necessary for the bonding of the lead 5c (6c) and the current collecting tabs 2a, 2b (3a, 3b).

In addition, the lead 5c (6c) near the ultrasonic-bonded portion is decreased in thickness and is transitioned to the lead 5a (6a) having an increased thickness at the middle of its extension from the ultrasonic-bonded portion to the external terminal 9 (10). This configuration makes it possible to minimizes an increase in the electric resistance, which would otherwise be caused by a decrease in the cross-sectional area, at the path configured to transmit current from the current collecting tabs 2a, 2b (3a, 3b) to the external terminal 9 (10). In this regard, the closer to the ultrasonic-bonded portion the portion where the cross-sectional area is increased is, the more the increase in the electric resistance is suppressed.

Figure 5:
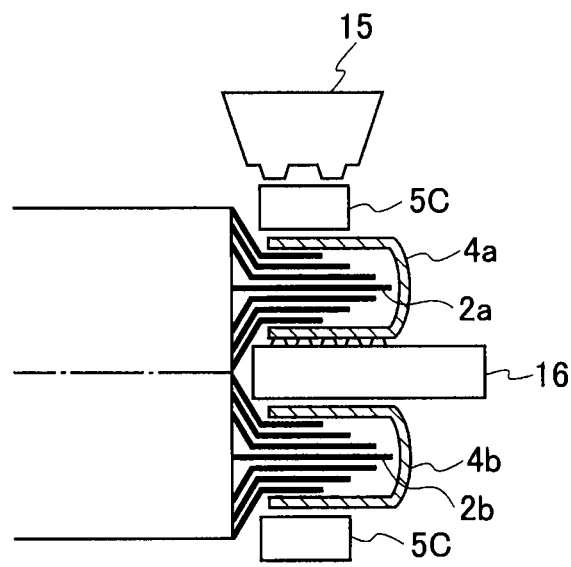
FIG. 5 is a cross-sectional view illustrating how ultrasonic bonding of a lead and a current collecting tab is performed.

FIG. 5 is a cross-sectional view illustrating how the ultrasonic bonding of the lead 5 and the current collecting tabs 2a, 2b is performed. An ultrasonic bonding method for a battery will be described by using FIG. 5. Here, the ultrasonic bonding of the current collecting tab 2a and the lead 5c will be described.

Note that the ultrasonic bonding of the current collecting tab 2b and the lead 5c can be performed in the same manner as that of the ultrasonic bonding of the current collecting tab 2a and the lead 5c, with an ultrasonic vibrating unit 15 being moved to and arranged at the current collecting tab 2b side.

First, the current collecting tab 2a is formed in which multiple metal foils are extended from the positive electrode or the negative electrode of the electrode group including the positive electrode and the negative electrode, and are overlapped with one another. Then, the metal foils of the current collecting tab 2a are clamped by the clip-shaped plate 4a.

Next, the thin lead 5c configured to connect the current collecting tab 2a and the external terminal 9 is placed on one surface side of the current collecting tab 2a. Further, a stage 16 is placed on the other surface side of the current collecting tab 2a. Subsequently, a load is applied, and ultrasonic vibration is applied, to the lead 5c, the metal foils of the current collecting tab 2a, the clip-shaped plate 4a, and the stage 16, by the ultrasonic vibrating unit 15. As a result, the lead 5c, the clip-shaped plate 4, and the metal foils of the current collecting tab 2a are ultrasonic-bonded.

Employing the ultrasonic welding as described above makes it possible to stack and weld the thin metal foils of the current collecting tab 2a at once. In addition, while a large load needs to be applied, the large load can be received by the stage 16. Moreover, using the ultrasonic welding eliminates damages which would otherwise be caused by heat as in the case of the laser welding.

(Second Embodiment)

Figure 6:
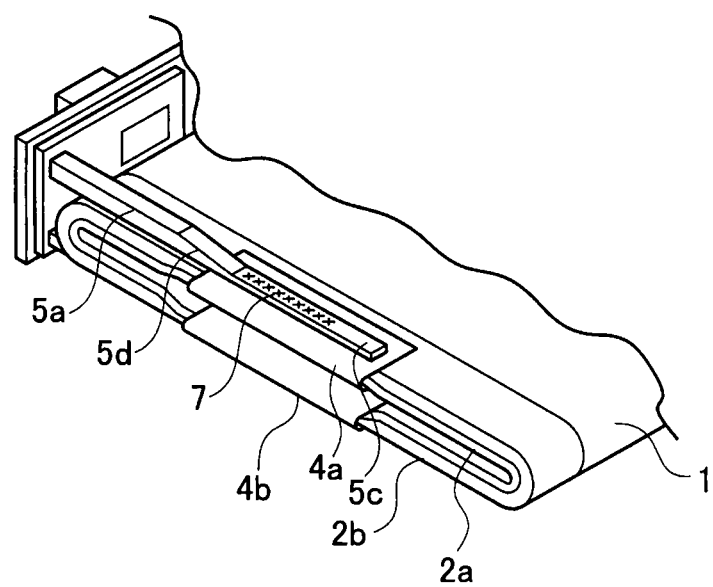
FIG. 6 is a perspective view of the vicinity of a portion where a positive-electrode lead having a cross-sectional area increased gradually is connected to positive-electrode current collecting tab, of a battery according to a second embodiment.

FIG. 6 is a perspective view of the vicinity of a portion where a positive-electrode lead 5a, 5c, and 5d having a cross-sectional area increased gradually is connected to a positive-electrode current collecting tab 2a, 2b, of a battery according to a second embodiment. In the second embodiment illustrated in FIG. 6, the lead includes a thick lead 5a, a thin lead 5c, and a tapered portion 5d having a cross-sectional area gradually increasing from the lead 5c to the lead 5a.

Even with the battery according to the second embodiment as described above, since the cross-sectional area is increased gradually from the lead 5c to the lead 5a with the tapered portion 5d, the same effects can be achieved as those of the battery according to the first embodiment.

(Third Embodiment)

Figure 7:
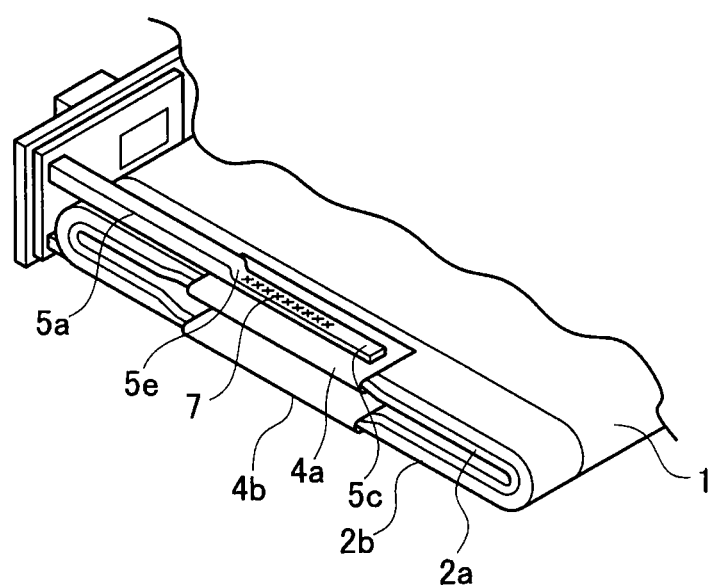
FIG. 7 is a perspective view of the vicinity of a portion where a positive-electrode lead having a curved surface in a portion with a cross-sectional area changed is connected to positive-electrode current collecting tab, of a battery according to a third embodiment.

FIG. 7 is a perspective view of the vicinity of a portion where a positive-electrode lead having a curved surface in a portion with a cross-sectional area changed is connected to a positive-electrode current collecting tab, of a battery according to a third embodiment. In the third embodiment illustrated in FIG. 7, the lead includes a thick lead 5a, a thin lead 5c, and a curved surface portion 5e having a cross-sectional area increasing from the lead 5c to the lead 5a.

Even with the battery according to the third embodiment as described above, since the cross-sectional area is increased from the lead 5c to the lead 5a with the curved surface portion 5e, the same effects can be achieved as those of the battery according to the first embodiment.

As described above, the batteries according to the first to third embodiments make it possible to perform the ultrasonic bonding of the current collecting tab and the lead at a portion having a small cross-sectional area, and thus facilitate the transmitting of the required ultrasonic vibration to the ultrasonic-bonded portion. Moreover, since the cross-sectional area of the lead is increased in a region from the ultrasonic-bonded portion to the external terminal, an increase in the electric resistance can be suppressed.

Although some embodiments of the present invention have been described so far, these embodiments are only illustrative, and are thus not intended to limit the scope of the present invention. The novel embodiments can be implemented in various other forms, and various omissions, replacements, and modifications may be made without departing from the gist of the present invention. These embodiments and their modifications are included in the scope and gist of the present invention, and are also included in the scope of the invention described in the scope of claims and equivalents thereof.

What is claimed is:

1. A battery comprising:
  a container;
  an electrode group being housed in the container and including a positive electrode and a negative electrode;
  a plurality of current collecting tabs being extended from any one of the positive electrode and the negative electrode of the electrode group, being located at an edge of the electrode group, and having a metallic foil overlapped with one another;
  a clip plate configured such that the metallic foil of at least one of the current collecting tabs can be inserted;
  a lead bonded to the clip plate at an ultrasonic bonding portion by ultrasonic bonding;
  a lid configured to close an opening portion of the container; and
  an external terminal provided on the lid and connected to the at least one current collecting tab via the lead, wherein
  the lead has a middle portion where a gradual increase of a cross-sectional area of the lead occurs between the lid and a center of the edge of the electrode group,
  the current collecting tabs include a planar surface opposing the lead,
  a thickness of the lead increases in a direction substantially perpendicular to the planar surface,
  a front end portion connects the lead to the external terminal, and
  the cross-sectional area of the lead is substantially constant from the middle portion to the front end portion.

* * * * *